United States Patent
Kazan et al.

(10) Patent No.: US 9,294,565 B2
(45) Date of Patent: Mar. 22, 2016

(54) EFFICIENT DATA ACCESS ON A SHARED DATA NETWORK

(75) Inventors: Wissam Kazan, Bellevue, WA (US); Marcin Przysucha, Redmond, WA (US); Hemantha Ponnuru, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 147 days.

(21) Appl. No.: 13/180,909

(22) Filed: Jul. 12, 2011

(65) Prior Publication Data

US 2013/0019027 A1    Jan. 17, 2013

(51) Int. Cl.
*H04L 29/08* (2006.01)
*G06F 17/30* (2006.01)

(52) U.S. Cl.
CPC ...... *H04L 67/1095* (2013.01); *G06F 17/30575* (2013.01); *H04L 67/1023* (2013.01)

(58) Field of Classification Search
CPC ..... H04L 67/322; H04L 67/104; H04L 65/80; H04L 67/1095; H04L 12/5692; H04L 67/327; H04L 67/1097; H04N 21/4622; G06F 17/30174; G06F 17/30575; G06F 11/2082; G06F 17/30017; G06F 3/0683; G06F 17/30091; G06F 17/30306; G06F 17/3053; G06F 3/067; Y10S 707/99932; Y10S 707/99931
See application file for complete search history.

(56) References Cited

U.S. PATENT DOCUMENTS

| | | | |
|---|---|---|---|
| 6,938,256 B2 | 8/2005 | Deng et al. | |
| 7,062,556 B1 | 6/2006 | Chen et al. | |
| 7,877,511 B1 | 1/2011 | Berger et al. | |
| 8,195,608 B2 * | 6/2012 | Arcese et al. | 707/634 |
| 2004/0221019 A1 * | 11/2004 | Swildens et al. | 709/217 |
| 2005/0144293 A1 * | 6/2005 | Limont et al. | 709/228 |
| 2005/0262246 A1 | 11/2005 | Menon et al. | |
| 2005/0278493 A1 * | 12/2005 | Lin et al. | 711/162 |
| 2006/0106937 A1 * | 5/2006 | Shields et al. | 709/228 |
| 2007/0094275 A1 * | 4/2007 | Fanning et al. | 707/10 |

(Continued)

OTHER PUBLICATIONS

Hwang, et al., "Enhancing the Performance of Metadata Service for Cloud Computing", Retrieved at <<http://ieeexplore.ieee.org/stamp/stamp.jsp?tp=&arnumber=5614392>>, IEEE/WIC/ACM International Conference on Web Intelligence and Intelligent Agent Technology, Aug. 31, 2010-Sep. 3, 2010, pp. 402-405.

Wang, et al., "Towards a Load Balancing in a Three-level Cloud Computing Network", Retrieved at <<http://ieeexplore.ieee.org/stamp/stamp.jsp?tp=&arnumber=5563889>>, 3rd IEEE International Conference on Computer Science and Information Technology, Jul. 9-11, 2010, pp. 108-113.

Bustos, et al., "Load Information Sharing Policies in Communication-Intensive Parallel Applications", Retrieved at <<http://www-sop.inria.fr/oasis/Mario.Leyton/publications/ciw08.pdf>>, From Grids to Service and Pervasive Computing, 2008, pp. 10.

*Primary Examiner* — Huy D Vu
*Assistant Examiner* — Bao G Nguyen
(74) *Attorney, Agent, or Firm* — Bryan Webster; Doug Barker; Micky Minhas

(57) ABSTRACT

One or more techniques and/or systems are disclosed for providing efficient synchronized data access. A request to access data on a first data provider is received. The requested data on the first data provider is synchronized with a second data provider, such that the first and second data providers respectively comprise a same version of the requested data. A provider score can respectively be determined for the first data provider and for the second data provider, where the provider score utilizes heuristic data that may indicate a data access rate and/or a cost of data access, for the respective first data provider and second data provider. The request for data access can be routed to the data provider that comprises a desired provider score, where a desired provider score may indicate a desired rate of data access and/or cost of data access.

20 Claims, 8 Drawing Sheets

(56) References Cited

U.S. PATENT DOCUMENTS

| | | |
|---|---|---|
| 2008/0016148 A1 | 1/2008 | Lora et al. |
| 2009/0177772 A1* | 7/2009 | Guan .......................... 709/224 |
| 2010/0042723 A1 | 2/2010 | Sundarrajan et al. |
| 2010/0146081 A1* | 6/2010 | Scherer et al. ................ 709/219 |
| 2010/0235891 A1* | 9/2010 | Oglesbee et al. ................ 726/5 |

* cited by examiner

EFFICIENT DATA ACCESS ON A SHARED DATA NETWORK

BACKGROUND

Two or more devices may be linked in a network to share data. For example, a user may wish to have access to a same version of a file across multiple devices and/or platforms. Data can be synchronized between multiple, linked devices, such that the respective devices comprise at least some data of a same version (e.g., have the same up-to-date information). Further, data sharing (e.g., synchronization) can be undertaken by a data sharing service, to which the respective devices are linked, such that when a state change occurs to the data on one device, the other device(s) are notified of the state change, and a data synchronization can be performed. Data sharing and/or data synchronization may be performed by linking the respective devices to a central connection service and/or by linking the respective devices to each other, such as in a peer-to-peer network.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A user may have a network of devices, respectively comprising shared data, such as in a synch system, for example. While the respective devices in the network may share a same version of at least some data, the user may wish to access the shared data from a remote device (e.g., a portable device remotely connecting to at least one of the devices in the network).

For example, the user may know that a desired file resides on their desktop PC at home, so they may utilize a peer-to-peer (P2P) network connection to access the desired file on the home PC, and copy it to the remote device. However, in some situations, the home PC may not be available, a work PC may have a connection with better (e.g., more reliable, faster, etc.) bandwidth and/or it may be more costly to access data on the home PC than one or more of the other devices in the data sharing network, for example. In this example, the user may wish to retrieve the desired data from another device in the network that comprises a same version of the data.

Accordingly, one or more techniques and/or systems are disclosed for providing access to desired data, where the data is synchronized between two or more devices in a data sharing network arrangement. For example, the user may remotely connect to a first device in the data sharing network to identify desired data on the first device. However, in this example, a second device in the data sharing network, comprising a copy of the desired data, may be able to provide the desired data faster than the first device (e.g., the second device may have a higher provider score than the first device). In this example, the user can send a request to access the desired data on the first device, but may be served the desired data by the second device.

Using heuristics data about the two or more devices linked in the data sharing network, a provider score may be determined for the respective devices, where the provider score can indicate an efficient (e.g., cost effective and/or performant, etc.) device for accessing the data. The access request can be forwarded to the device with the desired (e.g., least expensive) provider score, and the remote device can access the desired data from that device (e.g., instead of from the originally requested device if it does not have a desired provider score). In this way, for example, data access can be made more efficient, particularly when there are multiple devices that share the same data, and one device may provide a better data access experience than another.

In one embodiment of providing efficient synchronized data access, a request is received for access to data on a first data provider, where the data is synchronized between the first data provider and a second data provider, such that the first and second data provider comprise a same version of the requested data. Further, a first provider score can be determined for the first data provider and a second provider score can be determined for the second data provider. The provider score determination can be based on first heuristic data for the first data provider and second heuristic data for the second data provider. Additionally, the request to the first data provider can be routed to the first data provider if the first provider score comprises a desired provider score, else the request can be routed to the second data provider if the second provider score comprises the desired provider score.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
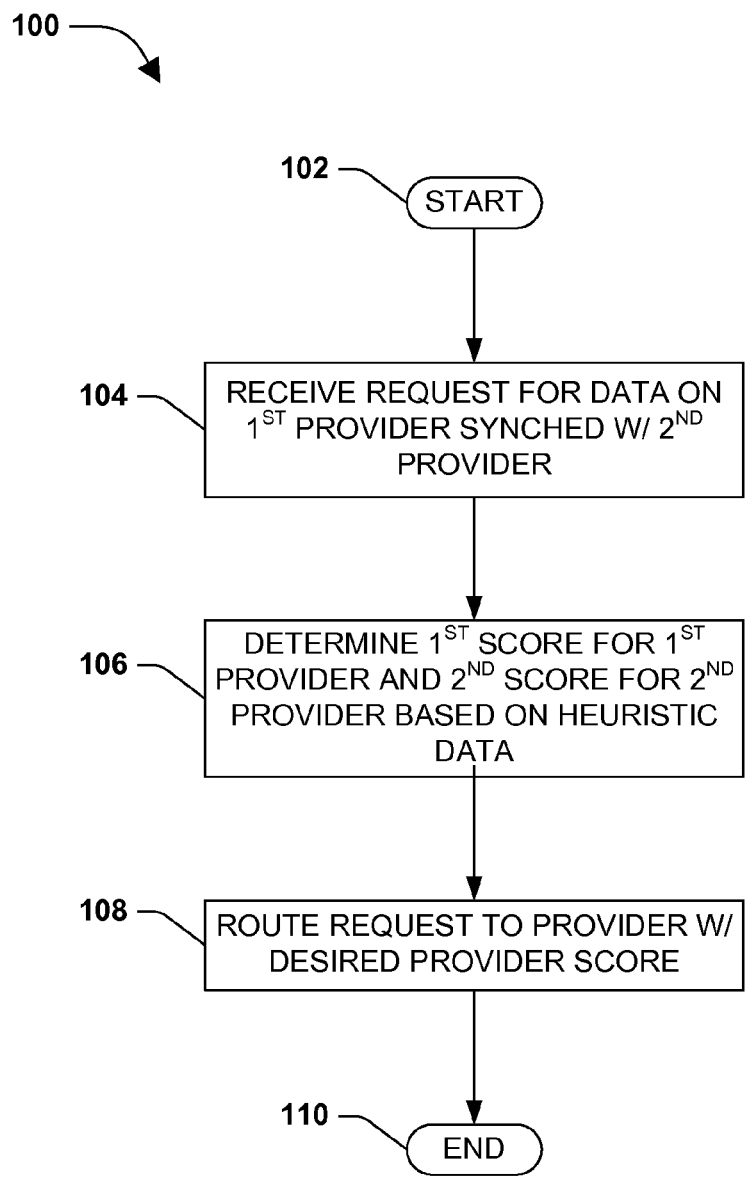
FIG. 1 is a flow diagram illustrating an exemplary method for providing efficient synchronized data access.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that can provide for an efficient, performant and reliable way to access data on a remote device, such as a portable device (e.g., smartphone, tablet, slate, laptop, notebook, handheld computer/console, camera, smart device), personal computer, console device, an/or network attached storage, across different device types. A cloud-based service may comprise information about devices linked in a user's data sharing network that can be used to identify performance-based metrics for the respective devices. Further, the cloud-based service may comprise information that identifies the data stored, and/or shared, by the respective devices. When device A attempts to retrieve data from device B in the user's network, the service may identify that device C, for example, can provide more performant access to the desired data, and route the request to retrieve the data to device C. It may be appreciated that while examples such as laptops, PCs, cameras, etc. are mentioned herein, the instant disclosure including the scope of the appended claims is not intended to be limited to merely the examples provided. For example, potentially any device with a processor, microprocessor, processing unit, etc. may have application to the instant disclosure.

FIG. 1 is a flow diagram illustrating an exemplary method 100 for providing efficient synchronized data access. The exemplary method 100 begins at 102 and involves receiving a request to access data on a first data provider, where the requested data is synchronized between the first data provider and a second data provider, at 104. For example, the first and second devices may be comprised in a user's data sharing network; and a third device may remotely send a request to retrieve desired data from the first device, which is synched with the second device.

At 106, a first provider score is determined for the first data provider, and a second provider score is determined for the second data provider. When determining the provider scores, first heuristic data is used for the first data provider and second heuristic data is used for the second data provider. At 108, the received data access request is routed to the first data provider if the first provider score comprises a desired provider score; or the received data access request is routed to the second data provider if the second provider score comprises the desired provider score. For example, the data access request can be routed to the data provider that has a data score that may provide a desired performance (e.g., most efficient and/or fastest, etc.) for accessing the data.

Figure 2:
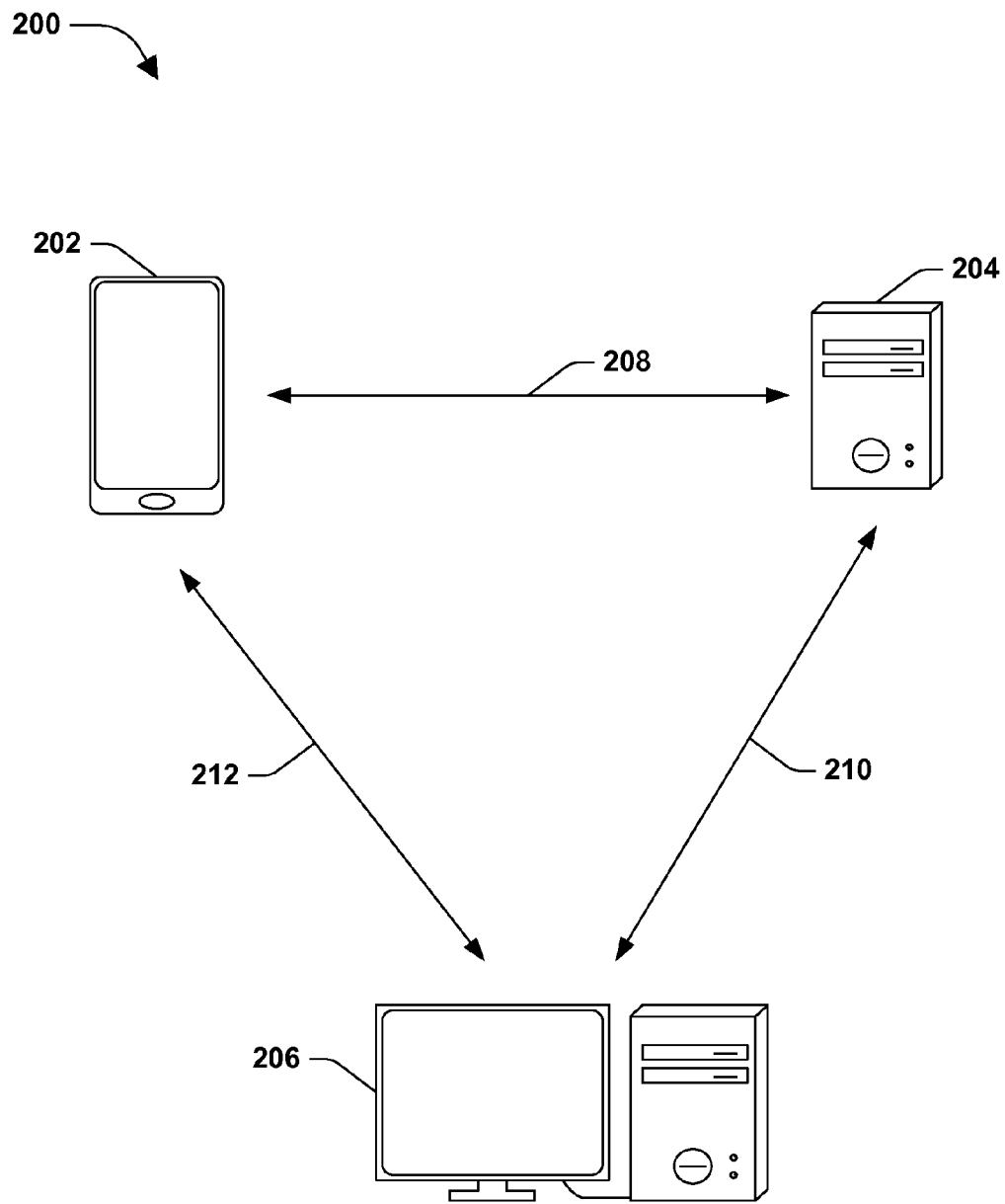
FIG. 2 is a component diagram illustrating an example embodiment of a previous or existing data-sharing environment.

As an illustrative example, FIG. 2 is a component diagram illustrating an example embodiment 200 of a data-sharing environment. In this example embodiment 200, the data-sharing environment comprises three linked devices, a portable computing device 202 (e.g., smart-phone, media player, tablet, etc.), a personal computer 206 (PC), and a server or storage device 204. In one embodiment, the respective devices 202, 204, 206 can comprise a connection 208, 210, 212 with one another, such as in a peer-to-peer network arrangement.

For example, the portable device 202 may comprise a wireless connection 212 with the PC 206 and a mobile connection 208 (e.g., cellular) with the server 204. Further, as an example, the PC 206 may comprise a network connection 210 (e.g., wired, connecting with the Internet) with the server 204. The devices 202, 204, 206 may shared data with one another, such as in a synch environment, or may merely share some data with one device (e.g., desktop app data shared between the PC 206 and the server 204), and other data with the other device (e.g., mobile app data shared between the portable device 202 and the PC 206).

In this example embodiment 200, the portable device 202 can send a request to the PC 206 to retrieve a file stored thereon, for example, over the wireless connection 212. In this example, the requested file may be synchronized with the server 204, such that both devices 204, 206 comprise a same version of the requested file. Further, the request can be fulfilled from the PC 206, even if the server 204 may provide a more performant retrieval of the requested file, for example, due to power requirements of the retrieval operation, the bandwidth of the respective connections 208, 212, processing capabilities and/or other performance-based characteristics of the respective devices 204, 206.

Figure 3:
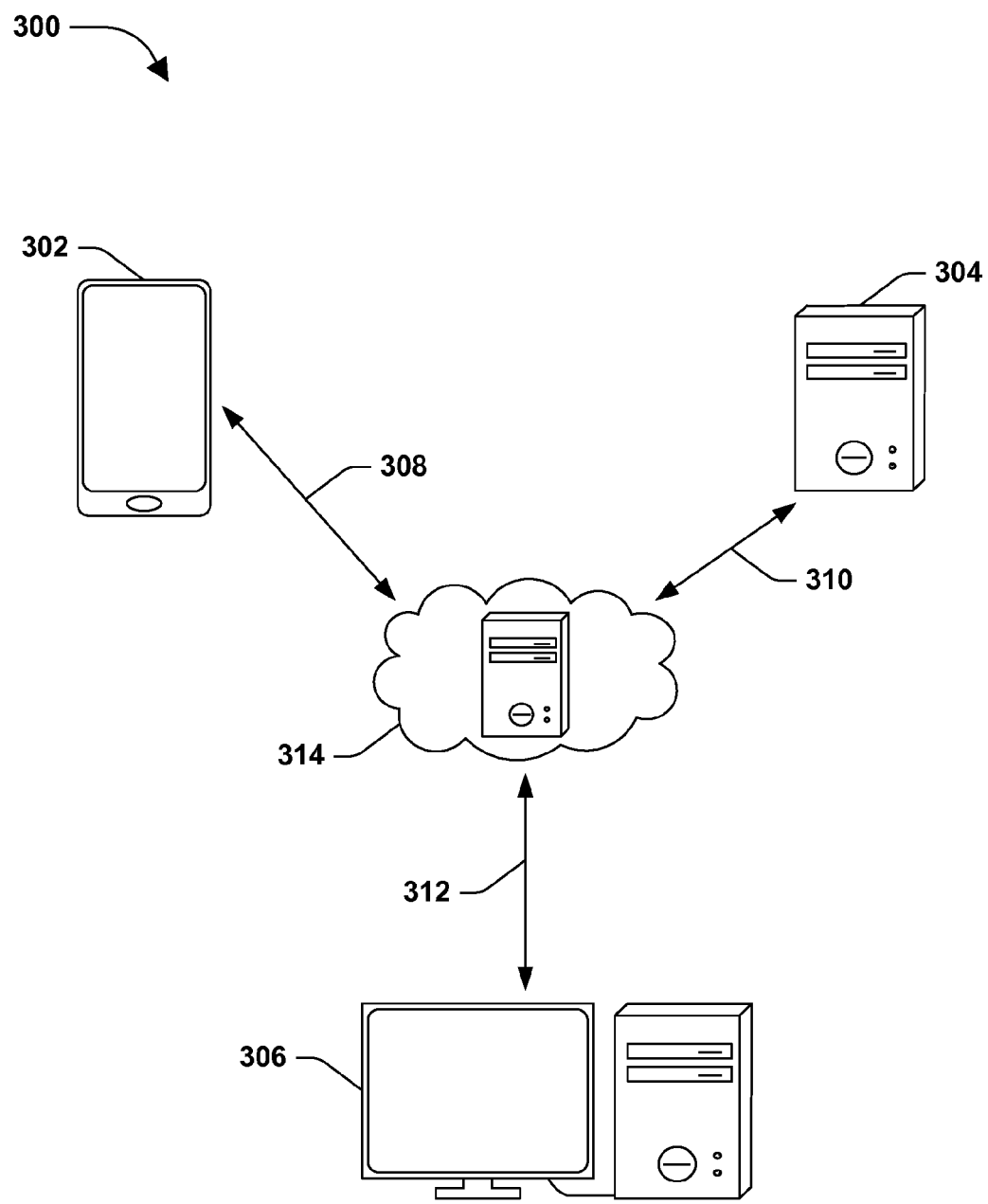
FIG. 3 is an illustration of an example embodiment of an environment where one or more portions of one or more techniques described herein may be implemented.

As another illustrative example, FIG. 3 illustrates an example environment 300 where one or more portions of one or more techniques described herein may be implemented. In this example environment 300, two devices 304, 306 are respectively connected 310, 312 (e.g., in a users data sharing network) to an online network 314, such as a cloud-based, data sharing service (e.g., Internet-based data-synch service). As an example, the device 304 may comprise a data backup storage server, which comprises files synchronized with the device 306, comprising a desktop computer. In this example, a user of a device 302, comprising a portable computing device, may wish to retrieve a file that the user knows is resident on the desktop computer 306.

In this example environment 300, a request to retrieve the desired file from the desktop computer 306 can be sent from the portable computing device 302 to the online network 314, over a remote connection 308. Further, the online network 314 may comprise heuristic data for the desktop computer 306 (e.g., first heuristic data for the first data provider), and for the storage server 304 (e.g., second heuristic data for the second data provider). In one embodiment, the heuristic data can comprise information about performance and/or data cost characteristics of the respective devices, such as bandwidth of the device's connection (e.g., 310, 312), whether the device comprises a paid versus an unpaid network, what a cost per MB of data may comprise, CPU usage/capabilities, memory consumption/capabilities, whether the device is active or idle and/or many more.

Because the respective devices 304, 306 comprise synched data, for example, a same version of the requested file may be found on both the desktop computer 306 and the storage server 304. A data provider score can be determined for the respective devices 304, 306, which may comprise a metric combining one or more of the heuristic data for the particular device. In one embodiment, the provider score can comprise an indication of the corresponding device's potential performance for accessing the requested data (e.g., rate of data access, etc.) and/or a potential cost (e.g., computing resource cost and/or or price of data access, etc.) for accessing the data.

In this embodiment, for example, the device that has the desired provider score may be selected for accessing the requested data. For example, the storage server 304 may be able to provide the requested file in a more performant manner than the desktop computer 306, due to the bandwidth of its connection 310, by having a faster file access drive, by having faster CPU performance with less load and/or more. However, for example, the desktop computer 306 may be able to provide the requested file at a lower cost per Mb of data, due to having a lower cost for the connection 312. In one embodiment, the desired provider score may comprise weighted portions, for example, where cost comprises a first weighting and performance comprises a second weighting, where the weighting may be determined by a desired outcome (e.g., based on user preferences) and/or adjusted as needed, for example.

In the example environment 300, the online network service 314 can receive the request from the portable device 302, and may direct the request to the device 304, 306 comprising the desired provider score (e.g., comprising the most performant, the most cost effective, or a combination of both). Because both devices can comprise synched data, the request may be routed to the storage server 304, even though the request was originally directed to the desktop computer 306, for example. The storage server 304 can receive the request and provide appropriate access to the requested file, such as by forwarding the file to the portable device, such as via its connection 310 to the online network service 314, or using another connection (not shown) directly with the portable device (e.g., in a peer-to-peer connection, as in 208 of FIG. 2).

Figure 4:
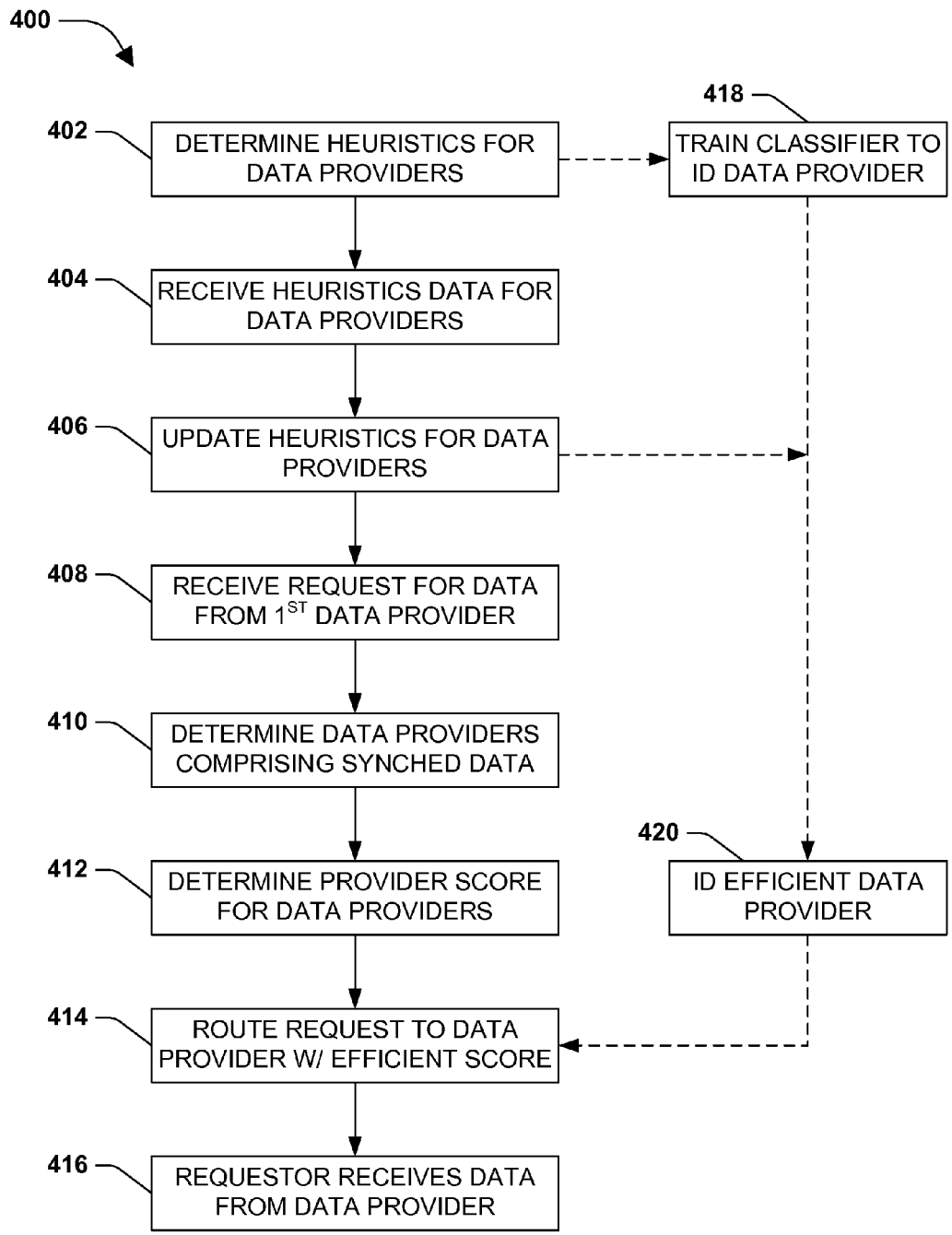
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. At 402, heuristic data for one or more data providers can be determined. For example, typical operational parameters may be identified for a plurality of devices, such as for handheld devices (e.g., smart phones, portable gaming devices, handheld computers, tablets, etc), portable computers (e.g., laptops), personal computers, console devices, servers, etc., in order to determine general heuristic data for respective devices, and/or device categories. As an example, heuristic data can comprise system-type parameters, such as data storage capability, system memory status/capability, CPU status/capability and/or power status/capability. Further, other system operational information for a device can comprise data transfer bandwidth status/capability, data transfer cost, power status (e.g., how much power is available/left for a device), activity status, availability status and/or network connectivity status.

In one embodiment, the general heuristics data for a device/device-type may be used as a baseline to identify a provider score. In one embodiment, at 418, the general heuristics data may be used to train a classifier to identify a provider score for a data provider and/or identify a desired data provider for a request. For example, a classifier may be trained over a set of data comprising heuristics data for a variety of devices/device types, so that when actual heuristics data is input to the classifier it may be able to identify a desire data provider for the request (e.g., most efficient and/or most cost effective, etc.).

At 404, heuristics data can be received for respective data providers of a data sharing network. For example, a user's network may comprise a plurality of devices, respectively sharing access to data, such as in a synched data network. In this example, the devices respectively comprise data providers, as they may be able to provide access to the shared data residing thereon, such as to a remote device that accesses the user's network to retrieve data.

In one embodiment, first heuristic data can be received for a first data provider and second heuristic data can be received for a second data provider, in the data sharing network. In this embodiment, the respective first and second heuristic data can comprise systems operation information for the data provider. For example, the systems operation information may comprise real-time operational parameters for the respective data providers, such as current connection bandwidth, current systems usage/capabilities, current availability, current cost for accessing data and/or other information that may affect access to the data on the data provider. It may be appreciated that while examples such as bandwidth, cost, connectivity, etc. are mentioned herein, the instant disclosure including the scope of the appended claims is not intended to be limited to merely the examples provided.

In one embodiment, the first and/or second heuristics data can be received by periodically polling the first data provider for the first heuristic data and/or the second data provider for the second heuristic data. For example, an online network service (e.g., 314 of FIG. 3) that facilitates synchronization of the data for the shared data network may periodically send requests for heuristics data to the respective devices linked to the network. In response, a linked device can return the systems operation data to the online network service, for example. In that way, for example, up-to-date heuristics data may be maintained for the respective data providers. In one embodiment, if a response to the polling is not received for a data provider, the data provider may not be available for data access.

In another embodiment, the first and/or second heuristics data can be received by periodically receiving a push notification, comprising the heuristic data for a corresponding data provider, from the respective data providers. For example, the respective data providers in the data sharing network can send out updated heuristics data in a push notification to the online network service. A desired period may be used between the updated push notifications, for example, depending on how, and/or how often, the data sharing network is utilized. In one embodiment, an age of the heuristics data (e.g., how long since the last update) may be used in determining the provider score. For example, the heuristics data may be more negatively weighted as the age of the heuristics data increases. The age of the heuristics data may nevertheless indicate an availability of the data provider, for example, where a data provider that is not available does not provide the heuristics data.

At 406 in the example embodiment 400, stored heuristics data for the respective data providers can be updated with updated system operations information received for the respective data providers. For example, as illustrated in FIG. 3, a cloud-based data service 314 may store heuristics data for the respective data providers 304, 306, such as received from periodic polling and/or push notifications. Further, in this example, the stored information can be updated when new heuristics data, such as when systems operations information is received.

At 408 in the example embodiment 400, a request is received for data from a first data provider. For example, as illustrated in FIG. 3, the users data sharing network can comprise a first data provider 304, a second data provider 306 (e.g., and a third data provider, and a fourth, etc.). As an example, the user may remotely link to the shared data network from a third device 302 to retrieve data. In this example, the user knows the desired data is resident on the first data provider 304, and sends a request to the data service 314 to retrieve the desired data from the first data provider 304.

In one embodiment, the request for the data access may come from a requesting device that is associated with the first data provider and/or second data provider in a peer-to-peer (P2P) network. P2P networking can utilize a plurality of computers that reside at edges of a network, such as the Internet, for more than just client-based computing tasks. A computer in a P2P network can act as both a client and server (a peer) for many types of applications, transactions, etc., for example. Content and resources can be shared from both a center and the edge of the network, and shared resources of peers can be directly accessed from local storage, rather than sharing a file stored on a central server.

At 410 in the example embodiment 400, it can be determined whether the first data provider and a second data provider (e.g., and a third, etc.) comprise synchronized data. That is, for example, it can be determined whether another data provider in the data sharing network comprises a same copy of the requested data. In a data sharing system, such as a data synch system managed by a central data synch service, when a change in state of data on one device occurs, the state change can be synchronized with other devices linked to the data sharing system, for example.

At 412, a data provider score can be determined for the first data provider and for the second data provider (e.g., and third, etc.). In one embodiment, a base data provider score for a data provider type may be used when determining the data provider score. For example, as described above at 402, baseline heuristics data may be identified for a plurality of data provider categories, such as for handhelds, portables, desktops, consoles, etc.; and even for different types of the respective categories, such as smart-phones, handheld gaming devices, etc. in the handheld category; and tablets and laptops in the portables category, for example.

In this embodiment, a base data provider score may be determined for the respective data provider types, and for the first data provider type corresponding to the first data provider, and for the second base provider type corresponding to the second data provider. Further, these base data provider scores may be used in conjunction with the updated heuristics data, identified at 406, to determine a provider score for the first data provider, and for the second data provider (e.g., and third, etc.). That is, for example, a base data provider score for a data provider type can be updated using recently updated heuristics data for the data provider, which may comprise additional heuristics information not accounted for when determining the base data provider score, such as cost for data access, current bandwidth, etc. It may be appreciated that base data provider scores may not be used, and that merely (updated) device specific heuristic data may be used to determine a data provider score for a particular data provider.

In one embodiment, when determining a data provider score, at least some of the heuristics data may be weighted. In one embodiment, a first weighting can be applied to at least some of the first heuristic data for the first provider score based at least upon a data provider type of the first data provider; and/or a second weighting can be applied to at least some of the second heuristic data for the second provider score based at least upon a data provider type of the second data provider.

As an illustrative example, in FIG. 3, a portable-type data provider (e.g., 302) may comprise a less reliable connection 308 (e.g., cellular, wireless, etc.), and/or may comprise a less reliable power source (e.g., batteries), than that of a storage server-type data provider 304, or a desktop PC 306. In this example, a weighting that improves a score for the connection 310 of the server 304, and the connection 312 of the desktop PC, may be applied when determining the data provider score for these data providers 304, 306.

In one embodiment, determining the provider score for a data provider can be based, at least in part, upon a rate of access to the requested data; and/or may be based upon a cost of access to the requested data. For example, a provider score can comprise heuristics data that indicates how quickly the data may be accessed (e.g., Mb per second), and can comprise heuristics data that indicates how much it may cost to access the data (e.g., cost per Mb). In this embodiment, for example, a user may desire fast access to the data, without regard for increased cost (e.g., or vice versa), and can choose a data provider for data access based upon the provider score that indicates fast access. As another example, weighting may be applied to the rate of access, and/or cost of access, that indicates the users desired choice (e.g., speed over cost, cost over speed, or a combination of both).

In one embodiment, the updated heuristics data (from 406) can be input to the trained classifier (from 418). In this embodiment, for example, the classifier may have been trained to identify an efficient (e.g., cost effective and/or performant) data provider, at 420. In one embodiment, the updated heuristics data may be provided to the trained classifier in order to identify a data provider (e.g., from the first and second data providers) that comprises a desired provider score, based at least in part upon the first heuristic data and/or the second heuristic data.

As an example, the classifier can be trained to identify a desired data provider (e.g., based on speed and/or cost), using base heuristics data from one or more data provider types. In this example, the trained classifier can be updated with the first data provider heuristics data, and the second data provider heuristics data. Further, in this example, a desired cost to speed ratio (e.g., or some other metric) may be input to the classifier, which can then select the desired data provider for accessing the data.

At 414 in the example embodiment 400, the received request for accessing the data can be routed to the data provider (e.g., first or second) that comprises an efficient provider score (e.g., most performant, cost effective, or a combination of both). For example, if the data access request was addressed to the first data provider, but the second data provider comprised a more desirable provider score, the request can be routed to the second data provider. At 416, the requestor can access the data (e.g., copy the data) from the selected data provider, to which the request was routed. In this way, for example, the data provider that comprises a most efficient means for accessing the data can be used to access the data, even if the request was sent to a different data provider.

In one embodiment, the first data provider and/or the second data provider can comprise a cloud-based data service storing the synchronized data. As an illustrative example, in FIG. 3, the online data service 314 may comprise a cloud-based data store that provides storage of shared data. In this embodiment, for example, the cloud-based data store 314 may comprise a plurality of data, and the one or more devices 302, 304, 306 linked to the cloud-based data store 314 may respectively comprise local versions of the data. As an example, a user may wish to access data from the cloud service 314. In this example, a connection to the cloud service 314 may not provide an efficient means of access to the requested data, so a P2P connection to one of the connected devices 302, 304, 306 may be used to access the data instead.

A system may be devised that can provide a more effective way to access data from a shared data network, such as from a remote device. Heuristics, such as operation information and/or data costs, may be known and/or determined for devices that are linked in a data sharing network. These Heuristics may be used identify a performant and/or cost effective device in the shared data network for providing access to shared data stored by one or more of the devices. In this way, for example, when a user wishes to access data from their shared data network, the access request can be directed to the device in the network that may provide a more efficient data access experience.

Figure 5:
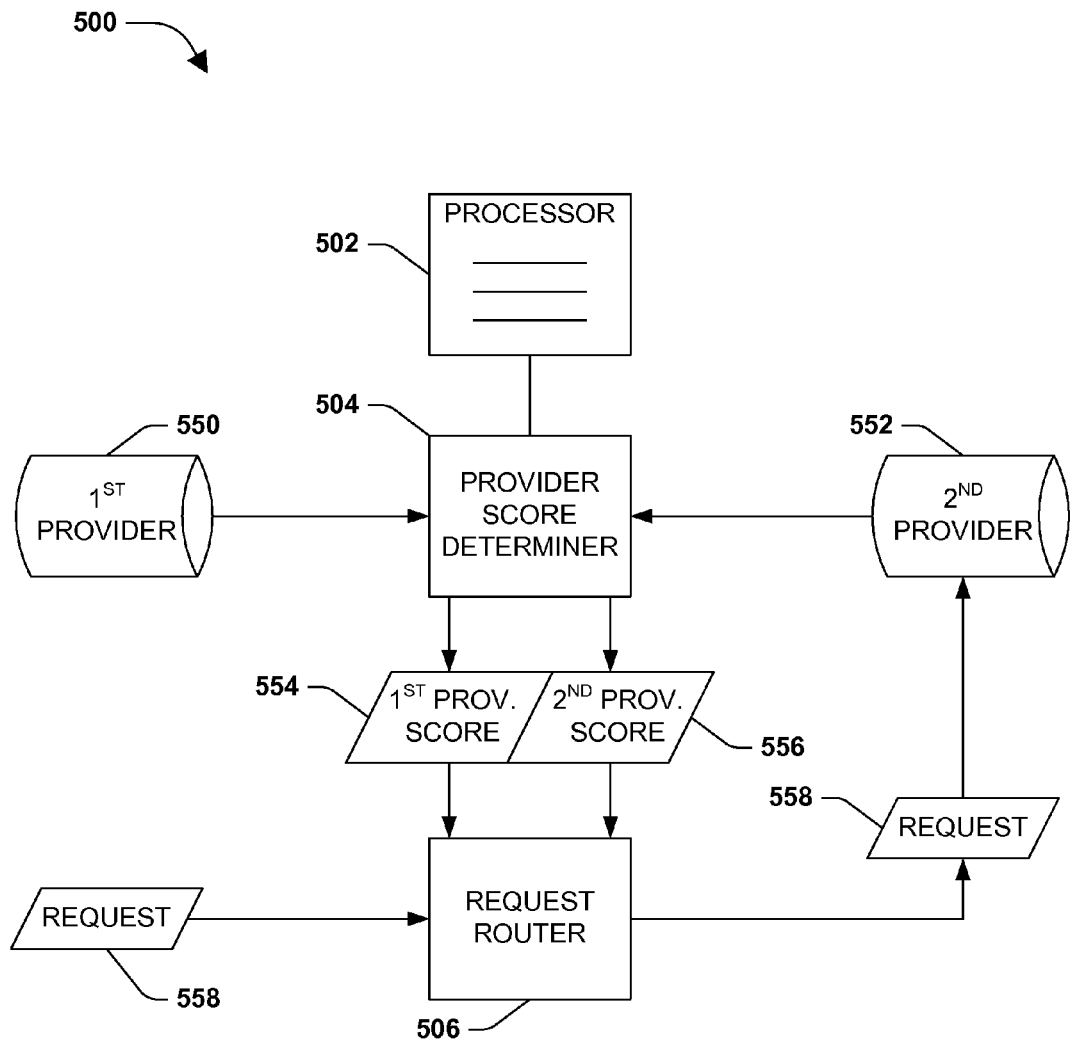
FIG. 5 is a component diagram illustrating an exemplary system for providing efficient synchronized data access.

FIG. 5 is a component diagram illustrating an exemplary system 500 for providing efficient synchronized data access. A computer-based processor 502 is configured to process data for the system, and is operably coupled with a provider score determination component 504. The provider score determination component 504 is configured to determine a first provider score 554 for a first data provider 550 and a second provider score 556 for a second data provider 552. Determining the provider score is based, at least in part, upon first heuristic data for the first data provider and second heuristic data for the second data provider.

A request routing component 506 is operably coupled with the provider score determination component 504, and is configured to route a received request 558 for accessing data on the first data provider 550. The request routing component 506 routes the request 558 to the first data provider 550 if the first provider score 554 comprises a desired provider score, or routes the request 558 to the second data provider 552, if the second provider score comprises the desired provider score. Further, data targeted by the request 558 is synchronized between the first data provider 550 and the second data provider 550, for example, such that a same version of the data resides in both the first data provider 550 and the second data provider 552.

Figure 6:
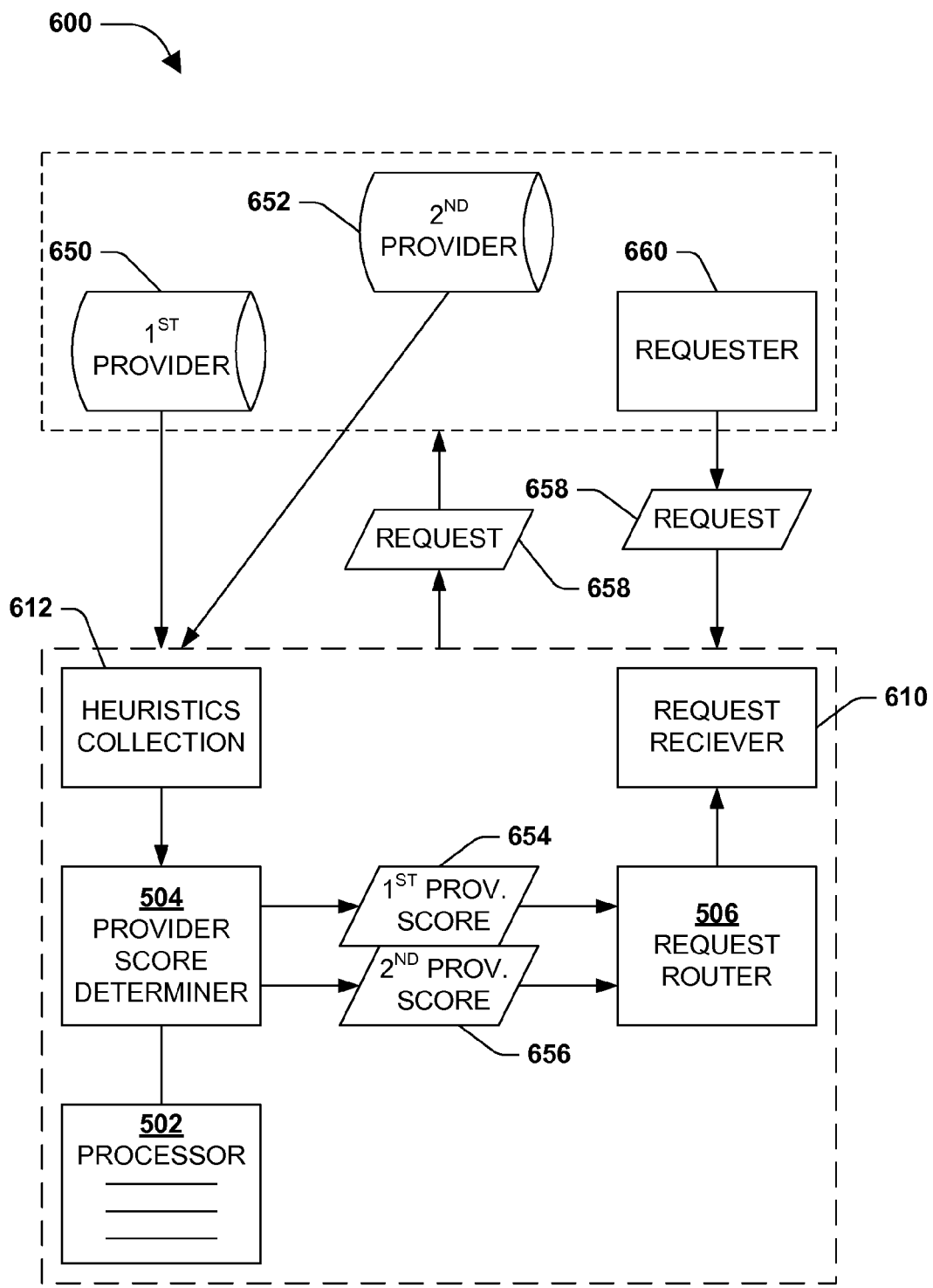
FIG. 6 is a component diagram illustrating an example embodiment where one or more systems described herein may be implemented.

FIG. 6 is a component diagram illustrating an example embodiment 600 where one or more systems described herein may be implemented. In this example, an extension of FIG. 5 is provided and thus description of elements, components, etc. described with respect to FIG. 5 may not be repeated for simplicity. The example embodiment 600 comprises a request receiving component 610 that is configured to receive a request 658 for accessing data on a first data provider 650. For example, a requesting device 660 (requester) may comprise a device that is outside of the data sharing network (e.g., does not comprise synchronized data with first and second data providers). In this example, the requester 660 can send a request 658 to a request receiving component 610 to access data on the first data provider 650.

In one embodiment, the requester 660, the first data provider 650 and the second data provider 652 may be comprised in a peer-to-peer network. That is, for example, the requester 660 (e.g., and second data provider 652) may comprise a connection with the first data provider 650 that allows for access to data resident on the first data provider 650 (e.g., through a direct or indirect connection). In this way, for example, the requester 660 may not need to use a central server to access data on the first data provider 650. In one embodiment, the requester 660 may comprise a peer-to-peer network with merely the first data provider 650, merely the second data provider 652, or both data providers 650, 652.

In one embodiment, the first data provider 650 (e.g., and/or second data provider) may comprise a cloud-based server that store the requested data, and which is synchronized with the second data provider 652. For example, a users data sharing network may comprise the first provider 650 as a cloud-based storage service, and the second provider 652 as the users desktop computer. Further, in this example, the requester 660 can comprise a device (e.g., tablet computer) that the user remotely connects to the first and/or second providers 650, 652, in a peer-to-peer network, to access data stored thereon.

In the example embodiment 600, a heuristic data collection component 612 can be configured to receive the first heuristic data for the first data provider 650, and/or the second heuristic data for the second data provider 652. The heuristics data can be used by the provider score determination component 504 to determine the first provider score 654, and/or the second provider score 656. In one embodiment, the heuristic data collection component 612 can receive the heuristics data by periodically polling the first data provider 650 for the first heuristic data, and/or the second data provider 652 for the second heuristic data. In another embodiment, the heuristic data collection component 612 can receive the heuristics data by periodically receiving a first push notification, comprising the first heuristic data, from the first data provider 650, and/or periodically receiving a second push notification, comprising the second heuristic data, from the second data provider 652. Collection component 610 may also selectively obtain first and/or second heuristic data via both pushing and pulling.

In this way, for example, updated heuristics data can be used to provide an updated provider score 654, 656 for the respective data providers 650, 652. Further, in this example, the request routing component 506 may route the data access request 658 from the requesting device 660 to the data provider 650, 652 that comprises the desired provide score (e.g., indicating a most performant and/or most cost effective data access experience). Upon receiving the data access request 658, the data provider receiving the routed request 658 can provide access to the requester 660, such as using a peer-to-peer connection (e.g., over the Internet).

Figure 7:
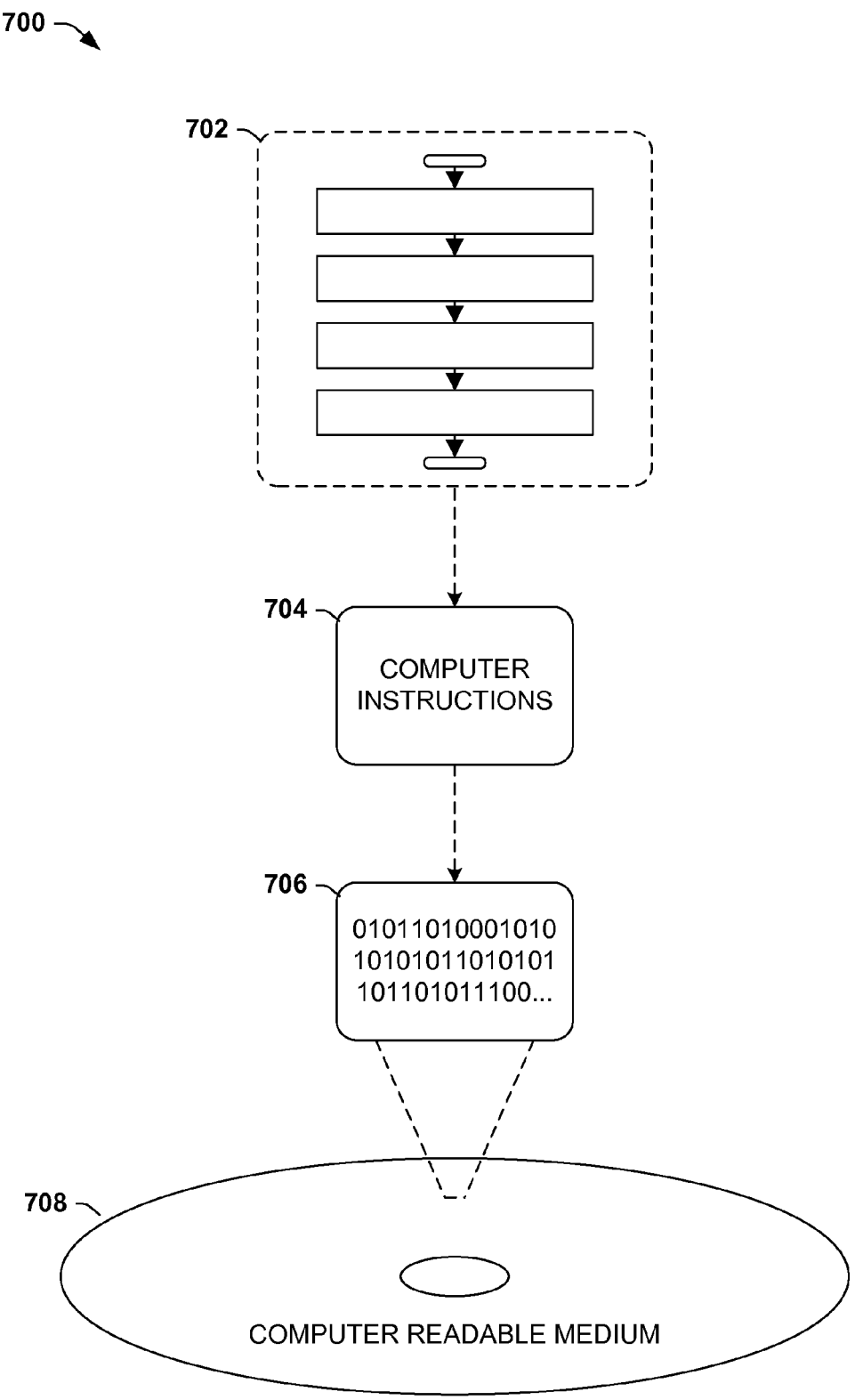
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
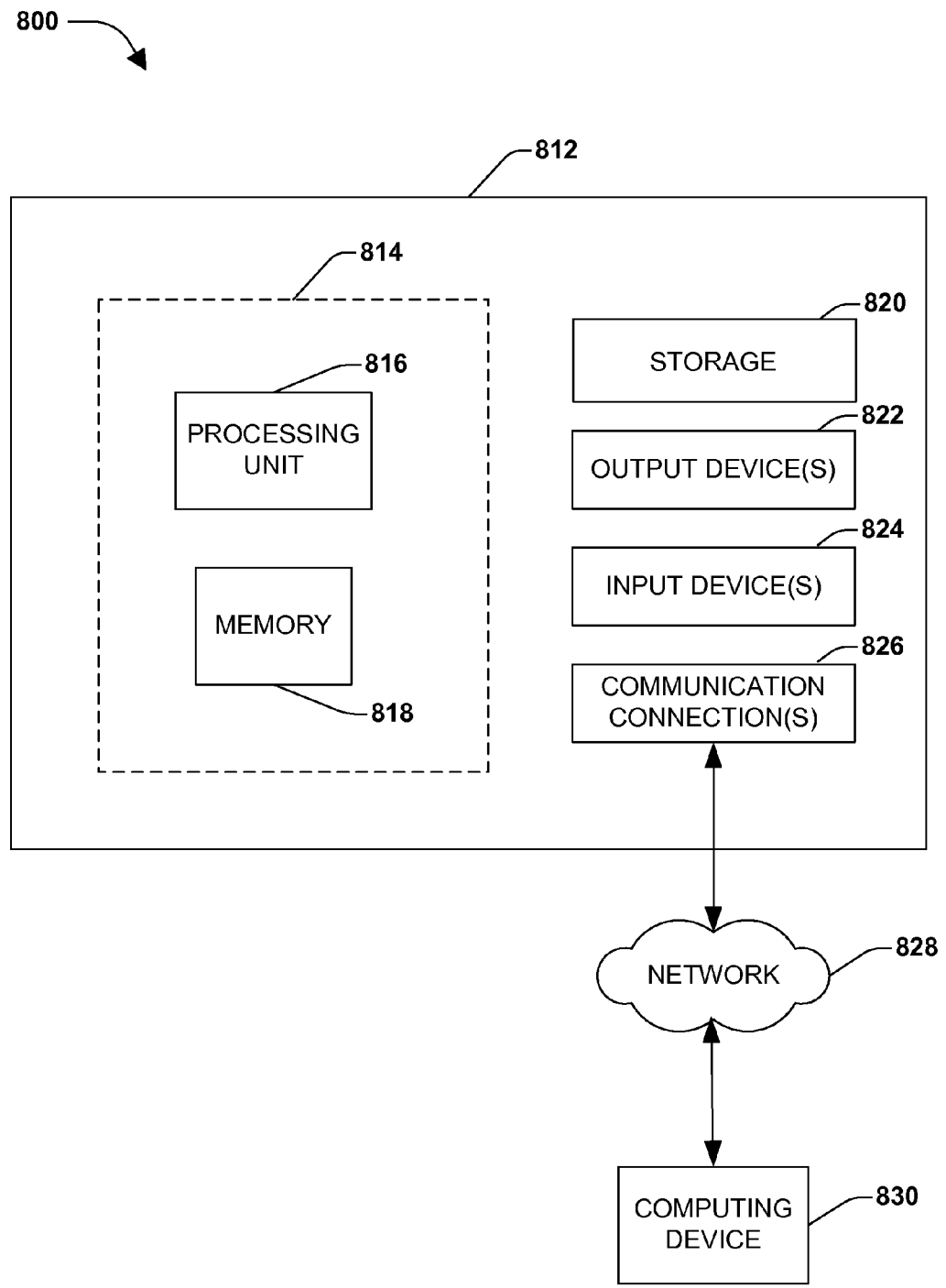
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, smartphones, tablets, Personal Digital Assistants (PDAs), media players, cameras and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method for selecting between two or more data providers, where the two or more providers each contain data that is synchronized as between the two or more data providers, the computer-implemented method being performed by one or more processors executing computer executable instructions for the computer-implemented method, and the computer-implemented method comprising:
    sending from a first computing system a request to access data from a first data provider, the data synchronized between the first data provider and a second data provider;
    receiving at a second computing system the sent request to access the data from the first data provider;
    storing at the second computing system baseline heuristic information for the first and second data providers, and generating from the stored baseline heuristic information a baseline data provider score for each of the first and second data providers, the data provider score reflecting at least performance and cost characteristics for determining how efficiently data can be accessed at each respective first and second data provider;
    at the second computing system, periodically updating heuristic information for the first and second data providers, and based on the updated heuristic information, updating the baseline data provider score for the first and second data providers to generate current baseline data provider scores for each of the first and second data providers;
    based on the current data provider score for the first and second data providers, selecting at the second computing system whichever of the first and second data providers has a current data provider score indicating more efficient access to the data than the other data provider; and
    the second computing system routing the request to the selected data provider.

2. The computer-implemented method of claim 1, wherein the baseline heuristic information and the updated heuristic information each comprise systems operation information for the first data provider and the second data provider.

3. The computer-implemented of claim 1, wherein periodically updating the heuristic information for the first and second data providers comprises one or more of:
    periodically polling at least one of data provider for heuristic information or the second data provider for heuristic information; and
    periodically receiving at least one of a first push notification comprising heuristic information from the first data provider or a second push notification comprising heuristic information from the second data provider.

4. The computer-implemented method of claim 1, wherein the baseline heuristic information and the updated heuristic information each comprise one or more of the following parameters for at least one of the data providers:
    data storage capability;
    system memory status;
    CPU status;
    data transfer bandwidth status;
    data transfer cost;
    power status;
    activity status;
    availability status; or
    network connectivity status.

5. The computer-implemented method of claim 1, wherein at least one or the other of the at least performance and cost characteristics of each data provider score is weighted.

6. The computer-implemented method of claim 1, wherein the first computing system is associated, in a peer-to-peer network, with one or more of:
    the first data provider; or
    the second data provider.

7. The method of claim 1, wherein routing the request to the selected data provider comprises routing the request to the second data provider even though the first computing system sent the request to access data from the first data provider.

8. The computer-implemented method of claim 1, wherein baseline and updated heuristic information is input to a training component that is configured to identify a given data provider based on a data provider score determined for the given data provider.

9. The computer-implemented method of claim 1, wherein age of the heuristics information used for a data provider score indicates availability of a data provider to respond to the request to access the data.

10. The computer-implemented method of claim 1, wherein the first data provider is first client computing system, the second data provider is a data backup storage server, and wherein the client computing system and data backup storage server are connected to an online cloud-based data sharing service.

11. The computer-implemented method of claim 10, wherein the first computing system is a second client computing system and the second computing system is the online cloud-based data sharing service.

12. The computer-implemented method of claim 4, wherein the one or more parameters for the at least one of the data providers is weighted when determining the data provider score for the at least one data provider.

13. A computing system comprising:
    memory containing executable instructions for a computer-implemented method for selecting between two or more data providers, where the two or more providers each contain data that is synchronized as between the two or more data providers;

one or more processors, which when executing the executable instructions, cause the computing system to perform the computer-implemented method for selecting between the two or more data providers, by performing the following:

receive at a second computing system a request sent from a first computing system to access data from a first data provider, the data synchronized between the first data provider and a second data provider;

store at the second computing system baseline heuristic information for the first and second data providers, and generate from the stored baseline heuristic information a baseline data provider score for each of the first and second data providers, the data provider score reflecting at least performance and cost characteristics for determining how efficiently data can be accessed at each respective first and second data provider;

at the second computing system, periodically update heuristic information for the first and second data providers, and based on the updated heuristic information, update the baseline data provider score for the first and second data providers to generate current baseline data provider scores for each of the first and second data providers;

based on the current data provider score for the first and second data providers, select at the second computing system whichever of the first and second data providers has a current data provider score indicating more efficient access to the data than the other data provider; and route the request from the second computing system to the selected data provider.

14. The computing system of claim 13, wherein the first data provider is first client computing system, the second data provider is a data backup storage server, and wherein the client computing system and data backup storage server are connected to an online cloud-based data sharing service.

15. The computing system of claim 13, wherein periodically updating the heuristic information for the first and second data providers comprises one or more of:

periodically polling at least one of the first data provider for heuristic information or the second data provider for heuristic information; and periodically receiving at least one of a first push notification comprising heuristic information from the first data provider or a second push notification comprising heuristic information from the second data provider.

16. The computing system of claim 13, wherein the first computing system, the first data provider and the second data provider comprise a peer-to-peer network.

17. The computing system of claim 14, wherein the first computing system is a second client computing system and the second computing system is the online cloud-based data sharing service.

18. A computer readable device comprising computer-executable instructions that when executed by one or more processors, cause the one or more processors to perform a computer implemented method for selecting between two or more data providers, where the two or more providers each contain data that is synchronized as between the two or more data providers, and the wherein the computer-implemented method comprises:

receiving at a second computing system a request sent by a first computing system to access the data from the first data provider;

storing at the second computing system baseline heuristic information for the first and second data providers, and generating from the stored baseline heuristic information a baseline data provider score for each of the first and second data providers, the data provider score reflecting at least performance and cost characteristics for determining how efficiently data can be accessed at each respective first and second data provider;

at the second computing system, periodically updating heuristic information for the first and second data providers, and based on the updated heuristic information, updating the baseline data provider score for the first and second data providers to generate current baseline data provider scores for each of the first and second data providers;

based on the current data provider score for the first and second data providers, selecting at the second computing system whichever of the first and second data providers has a current data provider score indicating more efficient access to the data than the other data provider; and the second computing system routing the request to the selected data provider.

19. The computer readable device of claim 18, wherein the executable instructions for the computer-implemented method further comprises instructions for periodically updating the heuristic information for the first and second data providers comprises one or more of:

periodically polling at least one of the first data provider for heuristic information or the second data provider for heuristic information; and periodically receiving at least one of a first push notification comprising heuristic information from the first data provider or a second push notification comprising heuristic information from the second data provider.

20. The computer readable device of claim 1, wherein baseline and updated heuristic information is input to a training component that is configured to identify a given data provider based on a data provider score determined for the given data provider.

* * * * *